United States Patent [19]
Eisner

[11] 3,815,704
[45] June 11, 1974

[54] METHOD FOR DETERMINING OPTIMUM SEISMIC PULSE
[75] Inventor: Elmer Eisner, Houston, Tex.
[73] Assignee: Texaco Inc., New York, N.Y.
[22] Filed: Dec. 26, 1972
[21] Appl. No.: 317,915

[52] U.S. Cl............................ 340/15.5 R, 181/.5 EC
[51] Int. Cl................................................... G01v
[58] Field of Search.......... 340/15.5 FB; 181/.5 EC, 181/.5 H, .5 XC

[56] References Cited
UNITED STATES PATENTS

| 3,363,720 | 1/1968 | Mifsud et al. | 181/.5 EC |
| 3,375,896 | 4/1968 | Beddo | 181/.5 EC |
| 3,386,525 | 6/1968 | Wandrum | 181/.5 H |
| 3,460,377 | 8/1969 | Kalustian | 340/15.5 |

Primary Examiner—Samuel Feinberg
Assistant Examiner—J. V. Doramus
Attorney, Agent, or Firm—T. H. Whaley; C. G. Reis

[57] ABSTRACT

Disclosed is a method for determining the optimum amplitudes at discrete frequencies for a seismic input pulse and for providing an input control to a seismic energy generator. In a vertical oscillatory seismic generator, the amplitude of the seismic input is a function of the frequency of the generator and the character of the ground. At an on site location, for each discrete frequency, the maximum undistorted amplitude is determined and recorded. The recorded and correlated optimized amplitude and frequency are used to drive a seismic generator vibrator at optimum seismic energy input conditions.

8 Claims, 5 Drawing Figures 3,815,704

METHOD FOR DETERMINING OPTIMUM SEISMIC PULSE

BACKGROUND OF THE INVENTION

This invention relates generally to improvements and methods for determining optimum pulse amplitude configuration for input to a vibratory seismic input source, and more particularly, for establishing the maximum undistorted pulse amplitude for discrete frequencies in a frequency sweep input for a vibratory seismic generator.

In geophysical prospecting, a seismic generator inputs energy into the earth at one point along a traverse so that the energy is transmitted through the earth from the input point and received at second locations along the traverse, the energy being propagated through the ground along a plurality of paths. One such seismic generator is known as a "vibroseis" and it generally consists of a hydraulc oscillator which generates vertical oscillations of a plate having a mass and the vertical oscillations input energy to the ground. The oscillation or frequency is controlled by an input control for the oscillator. Typically in an operation utilizing this type of source, the frequency is varied between a range of 5 to 50 hz within a predetermined time period. It will be appreciated that the mass, which is oscillated with respect to the ground, on the upward stroke can actually lift from the ground, or, on a downward stroke, can cause mechanical stop members to be engaged and limit downward travel. In either of these instances the energy input to the earth is no longer oscillatory as there is an interruption of the energy input to the ground and as a consequence, the input energy wave is distorted from its oscillatory configuration. The detection and interpretation of transmitted energy is difficult enough without introducing distorted energy waves so the system typically provides an oscillatory energy input at a constant amplitude which is below the level at which the mass will leave the ground or engage limit stops. This, however, does not permit the maximum efficiency to be obtained for the system.

At present, there is no provision for adjustment of the magnitude of the amplitude of the energy during the frequency sweep for the oscillator. At a given frequency input, the amplitude of weight or mass displacement required to generate a given force on the earth or ground depends upon the earth material itself. For example, a competent material of earth formation results in a larger force for a given displacement than would be the case in more compressible earth formation. In other words, the consistency of the earth formation affects the energy input to the earth formations for a given frequency and amplitude. Thus, for a constant amplitude the energy input can vary as a function of the frequency and is a function of the ground. What is desirable then is to maximize the amplitude of the oscillation for each frequency for the earth formations being investigated to a level just below the point where the energy input would become distorted because the limits for the oscillation of the mass are exceeded.

SUMMARY OF THE INVENTION

Briefly stated, the present invention contemplates a novel method of determining for discrete frequencies the largest possible amplitude which does not produce nonlinear effects in the use of a vibrating source. Having determined the optimum amplitude range for each frequency, the vibrating apparatus then can be controlled by a determined frequency amplitude correlated input and thereby maximize or optimize input of seismic energy by the vibrating apparatus to the earth. To determine the maximum undistorted amplitude, at each discrete frequency the amplitude of the input energy is detected and changed until the amplitude is distorted and the preceding undistorted amplitude value is recorded. The maximum amplitude for each discrete frequency is recorded. The recorded function of frequency and maximum amplitude is then used to drive a seismic generator.

The present invention and novel features thereof are set forth in the appended claims. The invention itself, as well as its purposes and advantages, will be best understood from the following description when taken in conjunction with the accompanying drawings in which:

DESCRIPTION OF THE PREFERRED EMBODIMENT

Figure 1:
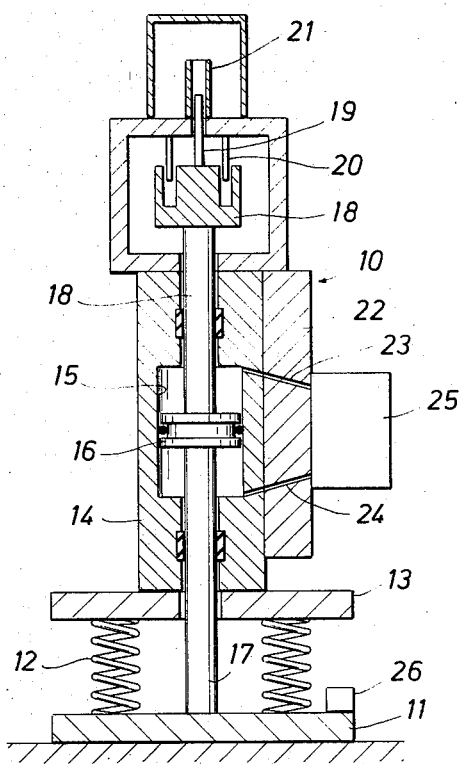
FIG. 1 is a schematic illustration of a typical vibratory type of seismic survey system.

Referring now to the drawings, in FIG. 1 there is shown a seismic exploration field unit where a vibratory seismic source 10 is located on the earth's surface and is used to generate seismic energy waves for propagation through the earth. A series of seismometers (not shown) are arranged in a predetermined geometric array along a traverse to detect the seismic energy waves which were generated by the vibrator 10. The seismic energy can travel as surface waves, reflected and refracted waves in a well known manner. The energy detected by the seismometers is the result of the superposition of all of the individual waves (surface, refracted and reflected) reaching each of the seismometers after traveling from the source generator 10. Obviously the individual components of this complex received energy have the frequency characteristics of the transmitted energy and have the travel times associated with their particular path to the detector. The electrical signals produced by the seismometer in response to the seismic energy are recorded simultaneously, but individually on separate tracts in a conventional recording means (not shown). The individual signals can also be recorded on tape so that they can be reproduced at a later time for further analysis.

The vibrator 10 as shown schematically and partially in FIG. 1 may be of the type disclosed in U.S. Pat. No. 3,282,372. The vibrator 10 includes a foot plate 11 which is in contact with the earth's surface. Static loading springs 12 are disposed between the foot plate and a base plate 13. The base plate 13 supports an attached cylinder 14 having an internal cylinder bore 15 which receives a piston 16. The piston 16 is attached to upper and lower piston rods 17 and 18 which are slidably and sealingly received in the cylinder bores. The lower rod 17 is attached to the foot plate 11 while the upper rod 18 has mounted thereon cores 18 and 19 associated respectively with windings 20 and 21 of a pair of control transformers. The control transformers are used for governing the stroke of the piston 16. A hydraulic manifold 22 is connected to the cylinder 14. Fluid flow through a pair of hydraulic ports 23 and 24 to the cylinder 15 is controlled by an electrically actuated four-way control valve 25. The valve 25 alternately switches high pressure fluid to the port 24 while connecting the port 23 to exhaust, then connecting the port 23 to high pressure fluid while connecting the port 24 to exhaust, such that the piston 16 will be reciprocated within the cylinder 15 in synchronism with an alternating electrical signal used to actuate the valve 25. A sensing mechanism 26 is connected to the plate 11 for detecting the amplitude and frequency of the plate and providing a corresponding electrical signal which is representative of the amplitude and frequency.

Figure 2:
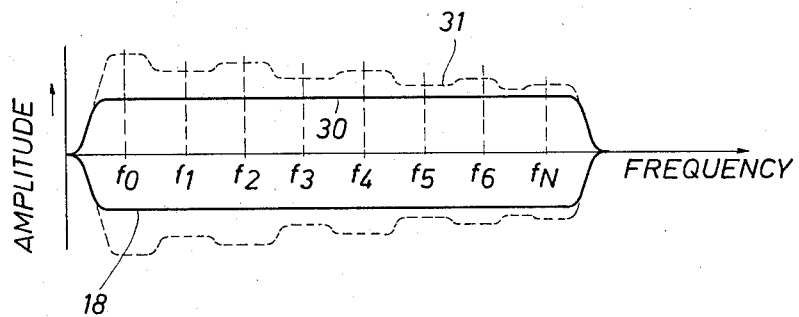
FIG. 2 is a simplified illustration of a pulse form for input to a vibratory source and illustrating amplitude as a function of frequency.

As indicated heretofor, the present invention involves the determination of maximum amplitude input for discrete frequencies for the input pulse for a sweep of frequencies. Referring to FIG. 2, a coordinate plot of frequency versus amplitude is presented. The envelope 30 illustrated in solid line represents a typical prior art input control sweep pulse of over changing frequencies for a finite time period and at a constant amplitude. In accordance with the present invention, at a number of discrete frequencies, for example frequencies $f_0$ - $f_n$, maximum undistorted amplitude values are predetermined at an on site location to provide a varying amplitude envelope as shown in dashed lines 31. The envelope signal is then used for control of the vibrator and the input of optimum energy into the ground for each frequency at an amplitude which is just short of producing distortion by virtue of overdriving the vibrator.

Figure 3:
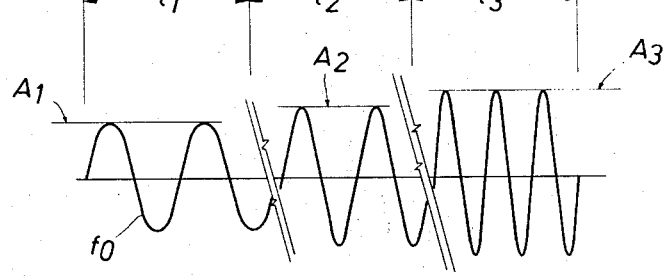
FIG. 3 is an enlarged segment from the pulse of FIG. 2 illustrating the sinusoidal characteristic of the input frequency.

In FIG. 3 an enlarged and partial detail of the varying frequency and pulse amplitude of FIG. 2 is illustrated. As illustrated in FIG. 3, for a time $t_1$, a sinusoidal waveform at a frequency $f_0$ with an amplitude $a_1$ is generated. At a higher frequency $f_2$ during a time interval $t_2$, a sinusoidal waveform at a larger amplitude $a_2$ is provided. During the time interval $t_3$, a frequency $f_3$, which is higher than frequency $f_2$, has a sinusoidal waveform with a greater amplitude $a_3$. By use of maximum amplitude valves, an envelope signal for amplitude is generated as a function of time and frequency.

Figure 4:
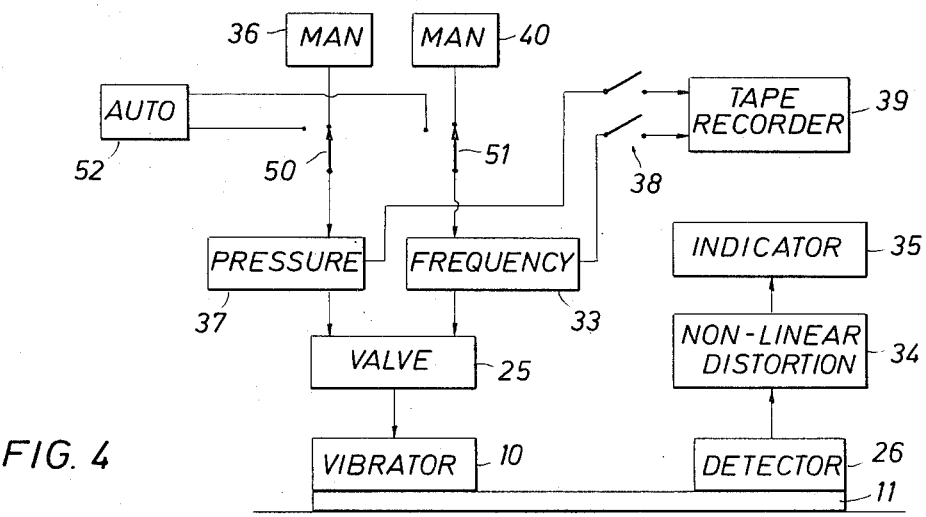
FIG. 4 is a schematic illustration of a system for determining maximum amplitude for discrete frequencies.

In the practice of the present invention, a vibrator 10 is located at the location for use. A frequency control generator 37 as shown in FIG. 4, controls the valve 25 of the vibrator to operate at a first discrete frequency $f_1$. The detector 26 on the vibrator plate 11 detects the oscillations of the vibrator plate and provides an output electrical signal representative of the oscillations. The output electrical signal is supplied to a nonlinear distortion circuit 34. The output from the distortion circuit 34 is supplied to an indicator 35. If the output from the detector circuit 26 is sinusoidal and is undistorted, the manual amplitude control 36 for the vibrator 10 is adjusted to increase the pressure input of a pressure generator 37 to the vibrator 10. Again, the sinusoidal characteristic of the plate is sensed and the amplitude is adjusted by the control 36. This adjustment is continued to the point where the amplitude input to the ground is just below the amplitude which produces a clipped off signal or distorted signal. At this point of maximum undistorted amplitude, a switch 38 is closed and an electrical signal representative of the discrete frequency and pressure signal are supplied to a tape recorder 39 for recording for a selected time interval required or desired for this portion of the pulse. The switch 38 is opened after the selected time for this interval of the pulse. The next discrete frequency signal is then input by the manual adjustment of the control 40 for the variable frequency generator 33. The pressure generator 37 is reset to operate the vibrator 10 at this next selected frequency. At this next frequency, the input pressure is again varied until a point below the threshold of distortion for the detected signal is located. This pressure and the frequency are recorded on the tape recorder by operating the switch 38 as described before. The sequence is continued for each of the discrete frequencies selected for developing the pulse control envelope. The pulse control envelope is similar to the envelope 31 as described with respect to FIG. 2. The frequency range or sweep for the pulse envelope can be 5 to 50 hz for a selected time interval. In this manner a sequence of frequency signals are input on a tape at the maximum pressure control amplitude for each frequency. Thus, over the frequency sweep the largest possible amplitudes which do not produce nonlinear effects are determined and correlated to an electrical control signal in the form of an envelope. This envelope is produced by interpolating the values between discrete frequencies and represents a smooth transistional control. The tape recording then can be used to input and control a vibrator 14 as illustrated in FIG. 1.

Figure 5:
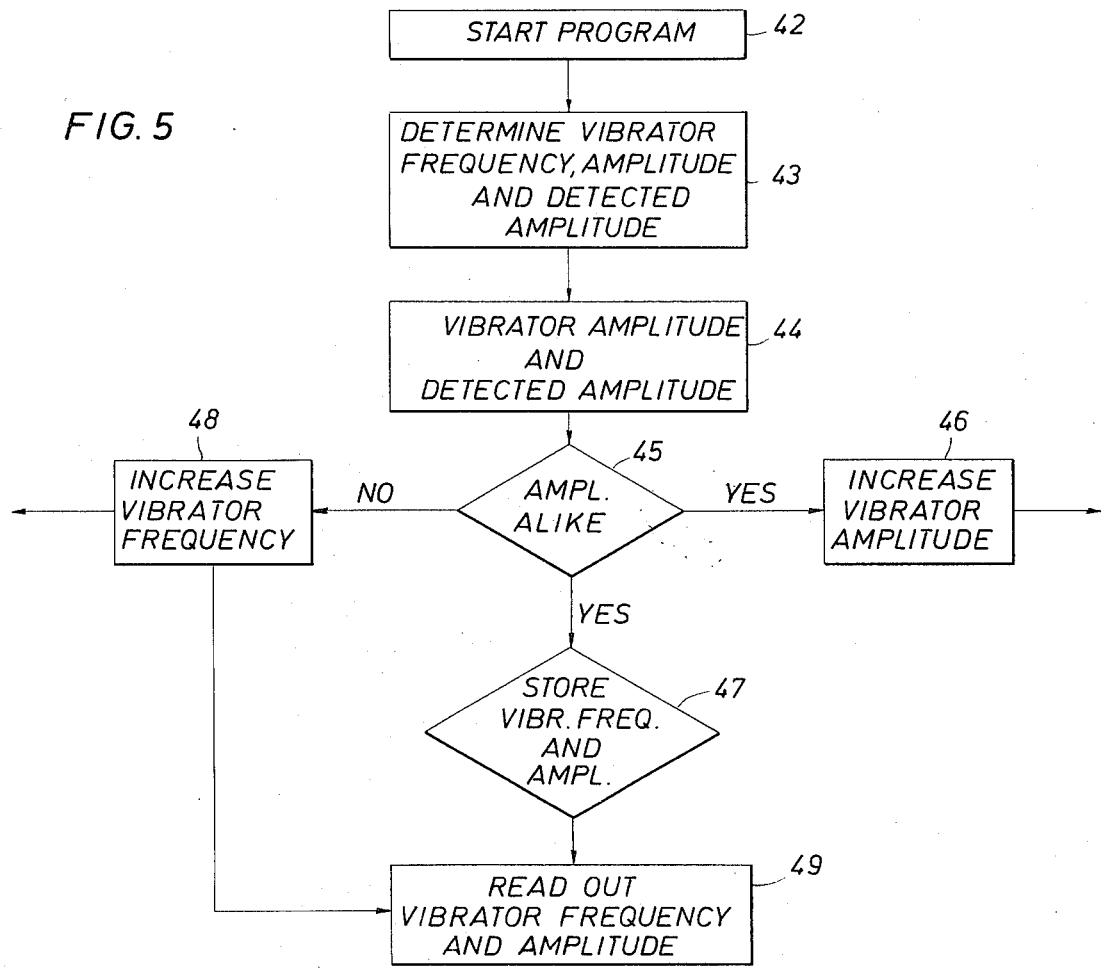
FIG. 5 is a flow chart of a computational system which can be used in automatically determining optimum amplitudes for the seismic pulse.

Referring now to FIG. 5, the technique for determining the optimum pulse amplitude by frequencies can be performed by proper programming of a computer. As shown in FIG. 5, after the program is started as indicated by the start program box 42, the frequency and pressure signals from the generators and the detected amplitude signals are determined (block 43) and the plate vibrator amplitude is compared to a sinusoidal waveform to determine if vibrator distortion exists because of overdriving (block 44). If the amplitude waveforms are alike (block 45), i.e., undistorted, then the program initiates an instruction (block 46) to increase the pressure input to the vibrator. At the same time, an instruction (block 47) stores the vibrator frequency and amplitude at the "alike" values. The process reiterates for each increment of increased amplitude for the vibrator until the amplitudes are not alike indicating that the detected amplitude has become distorted. At this time the "No" determination at the block 45 causes an instruction at block 48 to increase the frequency control to the next discrete value. At the same time the last stored vibrator amplitude and frequency are read out (block 49) for recording on a tape. The recording tape is then able to drive a vibrator at the optimum amplitude for each frequency in a frequency sweep or seismic pulse.

As shown in FIG. 4 an automatic control 52 can be connected by switches 50 and 51 to the pressure and frequency generators 37 and 33. Thus, the pressure and frequency are correlated over the sweep of frequencies as a function of time to input pressures to produce maximum amplitude of input energy to the ground over the sweep of frequencies.

From the foregoing description, it will be appreciated that this invention has provided a system for determining the maximum amplitude/frequency function for an input seismic control signal. While only one embodiment together with modifications has been described in detail herein and shown in the accompanying drawings, it will be evident that various further embodiments are possible without departing from the scope of the invention.

What is claimed is:

1. A method for determining a pulse configuration for an electrical control input signal to a vibratory seismic source comprising the steps of:

operating a vibratory seismic source at a location to input oscillatory seismic energy into the ground over a sweep of frequencies where such frequencies are represented by first electrical signals;

within said sweep of frequencies, determining the optimum amplitudes of energy input to the ground for a discrete number of frequencies where the optimum amplitude is that amplitude short of an amplitude value that is distorted because the seismic source is overdriven and the determined amplitudes are expressed as second electrical signals; and recording said first and second electrical signals as a function of time for producing an electrical control input signal in terms of amplitude, frequency and time.

2. The method of claim 1 wherein said sweep of frequencies is in a range of 5 to 50 hz.

3. The method of claim 1 and further including the subsequent step of driving a vibratory seismic source with said electrical control input signal.

4. A method for obtaining an electrical control input signal for a vibratory seismic energy generator comprising the steps of:

oscillating a hydraulically operated vibratory seismic energy generator at a first frequency and a first hydraulic driving pressure at a first location for developing an energy input of said seismic source to the ground at a first frequency and an amplitude functionally related to said hydraulic driving pressure;

detecting the amplitude of the energy input to the ground at said first frequency and producing a first electrical signal as a function of such amplitude and said frequency;

increasing the hydraulic driving pressure at said first frequency until said first electrical signal becomes distorted because the generator is being overdriven;

recording said first electrical signal at an amplitude level below the occurrence of a distorted first electrical signal;

changing the frequency to a second frequency after recording of the first electrical signal;

detecting the amplitude of the energy input to the ground at said second frequency and producing a second electrical signal as a function of such amplitude and said second frequency;

increasing the hydraulic driving pressure at said second frequency until said second electrical signal becomes distorted because the generator is being overdriven;

recording said second electrical signals at an amplitude level below the occurrence of a distorted second electrical signal;

repeating the steps of changing the frequency, detecting the amplitude, developing electrical signals and recording the signals; and deriving from said electrical signals an electrical control input signal as a function of maximum amplitude, frequency and time.

5. The method of claim 4 and further including the subsequent step of driving a vibratory seismic energy generator with said electrical control input signal.

6. The method for obtaining an electrical control input signal for a vibratory seismic energy generator comprising:

operating a vibratory seismic source at a location where a seismic survey is desired and producing oscillatory motion over a sweep of frequencies;

detecting the frequency and amplitude of the energy input of said seismic source to the ground at discrete frequencies and producing first electrical signals;

for each discrete frequency, comparing the first electrical signals to a reference signal;

for each discrete frequency, increasing the amplitude of said energy input of said seismic source to the ground so long as a comparison of said signals indicates that the amplitude of the energy input is not distorted by overdriving of the seismic source;

for each discrete frequency, storing the first electrical signal prior to each increase in amplitude of said energy input to the ground;

for each discrete frequency, recording said stored electrical signal whenever the amplitude of said energy input to the ground becomes distorted due to overdriving of the seismic source; and for each discrete frequency, upon recording of said stored signal, increasing the frequency of said energy input to the ground.

7. The method of claim 6 and further including the steps of deriving from said recorded signals an electrical control input signal as a function of amplitude, frequency and time.

8. The method of claim 7 and further including the step of applying said electrical control input signal to a vibratory seismic energy generator.

* * * * *